(12) United States Patent
Ahn

(10) Patent No.: US 7,167,161 B2
(45) Date of Patent: Jan. 23, 2007

(54) METHOD FOR CALCULATING MOVEMENT VALUE OF OPTICAL MOUSE AND OPTICAL MOUSE USING THE SAME

(75) Inventor: Jung-Hong Ahn, Yongin (KR)

(73) Assignee: Atlab Inc. (KR)

( * ) Notice: Subject to any disclaimer, the term of this patent is extended or adjusted under 35 U.S.C. 154(b) by 499 days.

(21) Appl. No.: 10/705,711

(22) Filed: Nov. 11, 2003

(65) Prior Publication Data

US 2004/0095323 A1 May 20, 2004

(30) Foreign Application Priority Data

Nov. 15, 2002 (KR) ........................ 10-2002-0071184
Nov. 7, 2003 (KR) ........................ 10-2003-0078558

(51) Int. Cl.
G09G 5/00 (2006.01)
H01J 40/14 (2006.01)

(52) U.S. Cl. ...................................... 345/166; 250/221

(58) Field of Classification Search ................ 345/156, 345/157, 158, 163–166; 250/221
See application file for complete search history.

(56) References Cited

U.S. PATENT DOCUMENTS 6,657,184 B2 * 12/2003 Anderson et al. .......... 250/221
6,664,948 B2 * 12/2003 Crane et al. ................ 345/166

* cited by examiner

Primary Examiner—Dennis-Doon Chow
(74) Attorney, Agent, or Firm—Cantor Colburn LLP

(57) ABSTRACT

Disclosed is a method for calculating a movement value of an optical mouse and an optical mouse using it. The method comprises the steps of: adjusting a reference frame update speed based on a movement speed of the optical mouse and updating the reference frame, calculating a first movement value, wherein the step of calculating the first movement value sets a reference area in the updated reference frame, and finds a correlation between a current input frame and the reference area of the reference frame to calculate the movement value, and resetting a reference area, wherein the step of resetting a reference area sets a new reference frame to which the reference area of the reference frame is moved by considering the calculated movement value according to the adjusted reference frame update speed. With the optical mouse according to the present invention, when calculating the movement value of the optical mouse the reference area is reset based on the movement of the optical mouse, thereby sensing the movement of small angles by increasing region of movement value.

11 Claims, 6 Drawing Sheets

METHOD FOR CALCULATING MOVEMENT VALUE OF OPTICAL MOUSE AND OPTICAL MOUSE USING THE SAME

CROSS-REFERENCE TO RELATED APPLICATION

This application claims the benefit of Korean Patent Application Nos. 2002-71184 filed on Nov. 15, 2002 and 2003-78558 filed on Nov. 7, 2003, the disclosure of which is hereby incorporated herein by reference in its entirety.

BACKGROUND OF THE INVENTION

1. Field of the Invention

The present invention relates to an optical mouse and, more particularly, to a method of calculating movement value of an optical mouse and an optical mouse using the method for sensing by increasing region of movement value that the optical mouse is able to find.

2. Description of the Related Art

Generally, as shown in FIG. 1, in the optical mouse, light 7 emitting from a light source 8 is reflected at a worktable surface 2, and the reflected light 6 passes through a lens 5 to be input to an image sensor 3 having hundreds of pixels. A shape of surface is detected by comparing differences among pixels of the image sensor 3. And then, by comparing with a pattern made in a previous sampling period, a movement value of the optical mouse is calculated.

Generally, in order to calculate the movement value of the optical mouse, reference frame.

A correlation between a current input sample frame and the reference area is calculated while scanning every pixel by one pixel unit in a zigzag direction from an upper left end to a lower right end of the sample frame.

The location of the sample frame whose correlations are the highest is found to calculate the movement direction and distance V(x, y) in pixel unit.

However, the optical mouse is actually moved by a human operator, the optical mouse can move in small angles.

Thus, in case that the optical mouse moves below one pixel unit, the correlation for calculating the movement value is typically obtained by comparing the input sample frame and the reference frame, and thus, if the optical mouse moves above 0.5 pixel, it calculates the movement value as being moved one pixel, and if the optical mouse moves below 0.5 pixel, it calculates the movement value as not being moved.

Moreover, when the movement of the optical mouse occurs, pixel values of the entire image sensor of the current input sample frame are stored into a memory and the pixel values are updated as the reference frame, and in the next sampling, the updated reference frame is used as a reference frame.

FIG. 2 is a diagram for illustrating a method for calculating the movement value of the optical mouse of FIG. 1.

It is assumed that the optical mouse of FIG. 2 moves 0.3 in a +X direction and 3 in a +Y direction during every sampling period.

To calculate the movement value of the optical mouse during a first sampling period, the optical mouse selects an $N_{th}$ frame 11 obtained through the 12×12 image sensor during the previous sampling period, as a reference frame, sets 6×6 area of a center of areas of the $N_{th}$ frame 11 as reference area 12a, and selects the $N+1_{th}$ frame 12 obtained through the 12×12 image sensor during the first sampling period as a sample frame.

Next, the location of the $N+1_{th}$ frame 12 having the highest correlation with the reference area 12a of the $N_{th}$ frame 11 is obtained.

As a result, it is shown that (0.3, 3) pixel position 12b of $N+1_{th}$ frame 12 has the highest correlation with the reference area 12a of the $N_{th}$ frame 11.

Thus, the optical mouse calculates the correlation as being moved 0 pixel in the X direction and 3 pixels in the Y direction during the first sampling period, and outputs the (0, 3) pixel as the movement value according to the correlation expression.

However, during the first sampling period, the optical mouse actually moves 0.3 pixel in the +X direction, and 3 pixels in the +Y direction, therefore, it cannot calculate the movement of 0.3 pixel in the +X direction between the actual movement value and the calculated movement value.

In order to calculate the movement value of the optical mouse during the second sampling period, the optical mouse updates the $N+1_{th}$ frame 12 obtained during the first sampling period as a reference frame, and resets the a center area of the updated reference frame area as a reference area 13a.

Thus, The $N+2_{th}$ frame 13 obtained through the image sensor during the second sampling period is selected as the sample frame 13, which is stored into the memory, and then the position having the highest correlation with the updated reference area 13a of the $N+1_{th}$ frame 12 is obtained, from which the movement value is calculated.

Thus, (0.3, 3) pixel position of $N+1_{th}$ frame 13 shows the highest correlation with the reference area 13a of the reference frame 12, and the optical mouse outputs (0, 3) pixel as the movement value.

In other words, the movement value of the optical mouse during the second sampling period has also an error of 0.3 pixel in the +X direction between the actual movement value and the calculated movement value like the movement value of the optical mouse during the first sampling period.

Therefore, while the actual movement value of the optical mouse during the first and the second sampling periods is (0.6, 6) pixel, the calculated movement value outputs (0, 6) pixel, it cannot calculate the movement of 0.6 pixel in the +X direction between the actual movement value and the calculated movement value. Accordingly, the optical mouse cannot calculate the movement in small angle, such as movement of (0.6, 6) pixel.

The conventional method for calculating the movement value of the optical mouse cannot calculate in small angles since the optical mouse changes the reference frame and the reference area in every sampling time that the movement above a predetermined value is generated and calculates the movement value of the optical mouse by one pixel unit.

In case that the optical mouse cannot calculate the movement in small angles, the optical mouse outputs an incorrect movement value.

In order to calculate the movement in small angles, the conventional optical mouse has a problem that the conventional optical mouse I the number of pixels and the memory capacity necessary for the optical mouse should be increased.

SUMMARY OF THE INVENTION

It is an object of the present invention, therefore, to provide a method for calculating a movement value of an optical mouse and the optical mouse using it, without adding the pixel number and memory, which is able to calculate movement in small angles.

To accomplish the above object, a method for calculating a movement value of an optical mouse according to an aspect of the present invention is characterized by comprising the steps of: calculating a movement value, wherein the step of calculating the movement value selects a reference frame, setting a reference area from the reference frame, and finds a correlation between a current input frame and the reference area of the reference frame; and resetting a reference area, wherein the step of resetting the reference area sets a new reference area to which the reference area of the reference frame is moved by considering the movement value calculated in the step of calculating the movement value.

To accomplish the above object, a method for calculating a movement value of an optical mouse according to another aspect of the present invention is characterized by comprising the steps of: adjusting a reference frame update speed based on a movement speed of the optical mouse and updating the reference frame; calculating a first movement value, wherein the step of calculating the first movement value sets a reference area in the updated reference frame, and finds a correlation between a current input frame and the reference area of the reference frame to calculate the movement value; and resetting a reference area, wherein the step of resetting a reference area sets a new reference frame to which the reference area of the reference frame is moved by considering the calculated movement value according to the adjusted reference frame update speed.

The step of updating the reference frame comprises the steps of: maintaining the adjusted reference frame update speed when the movement value calculated through the step of calculating the movement value is neither smaller nor larger than an estimated value corresponding to the adjusted reference frame speed, reducing the reference frame update speed when the calculated movement value of the optical mouse is smaller than the estimated value, and increasing the reference frame update speed when the calculated movement value of the optical mouse is larger than the estimated value.

The step of resetting the reference area sets an area to which the reference area of the reference frame is moved −p (where p is an integer) pixel in the X direction and −q (where q is an integer) pixel in the Y direction as a new reference area when the movement value is calculated as being moved m (where m is an integer) pixel in the X direction and n (where n is an integer) pixel in the Y direction.

To accomplish the above object, an optical mouse comprises: an image sensor that obtains a surface image of a sample frame and outputs the surface image in pixel; an A/D converter that receives an output of the image sensor and converts the output to a digital signal; and an image data processor that finds a correlation between a sample frame and the reference area of a reference frame to calculate a movement value and sets a new reference area to which the reference area of the reference frame is moved by considering the calculated movement value.

The image data processor resets an area to which the reference area of the reference frame is moved −p (where p is an integer) pixel in the X direction and −q (where q is an integer) pixel in the Y direction as the new reference area, when the movement value is calculated as being moved m (where m is an integer) pixel in the X direction and n (where n is an integer) pixel in the Y direction. An absolute value of m is larger than or equal to an absolute value of p and an absolute value of n is larger than or equal to an absolute value of q, m and p have not a sign which is different from each other, and n and q have not a sign which is different from each other.

The image data processor sets the reference frame update speed based on the movement speed of the optical mouse, and in updating a first frame, Is updates the reference frame, and in updating a second frame, sets the new reference frame to which the reference area of the reference frame is moved by considering in previous movement values.

The image data processor maintains the adjusted reference frame update speed when the calculated movement value is neither smaller nor larger than an estimated value corresponding to the adjusted reference frame speed, reduces the reference frame update speed when the calculated movement value of the optical mouse is smaller than the estimated value, and increases the reference frame update speed when the calculated movement value of the optical mouse is larger than the estimated value.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1:
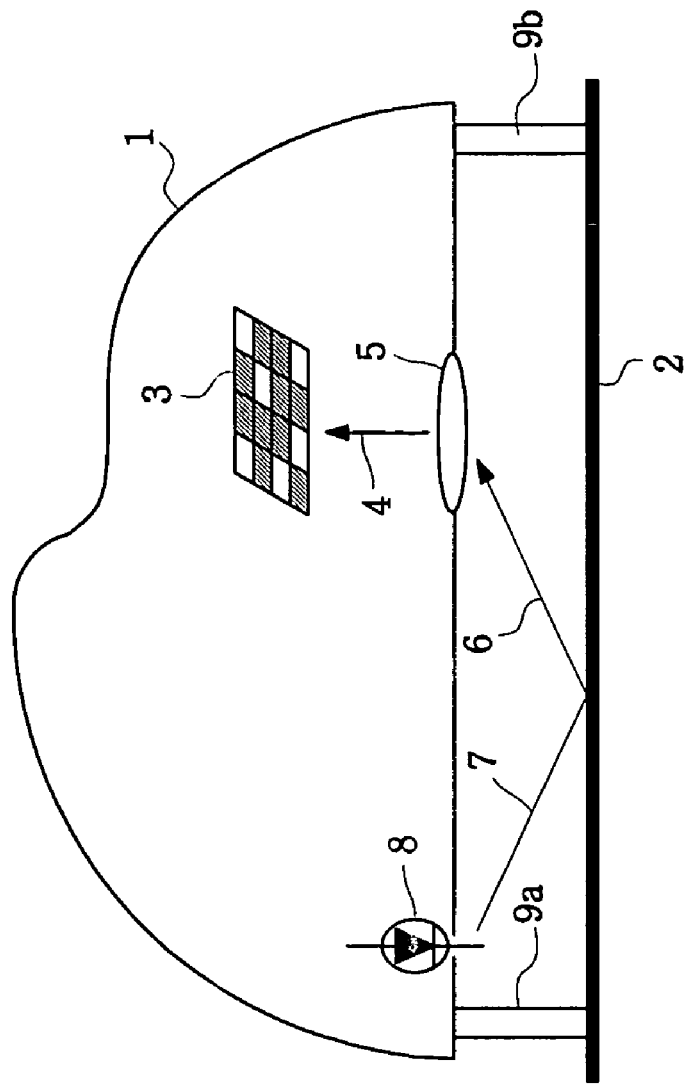
FIG. 1 is a diagram illustrating an example of an optical mouse configuration according to a prior art.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout the specification.

Figure 3:
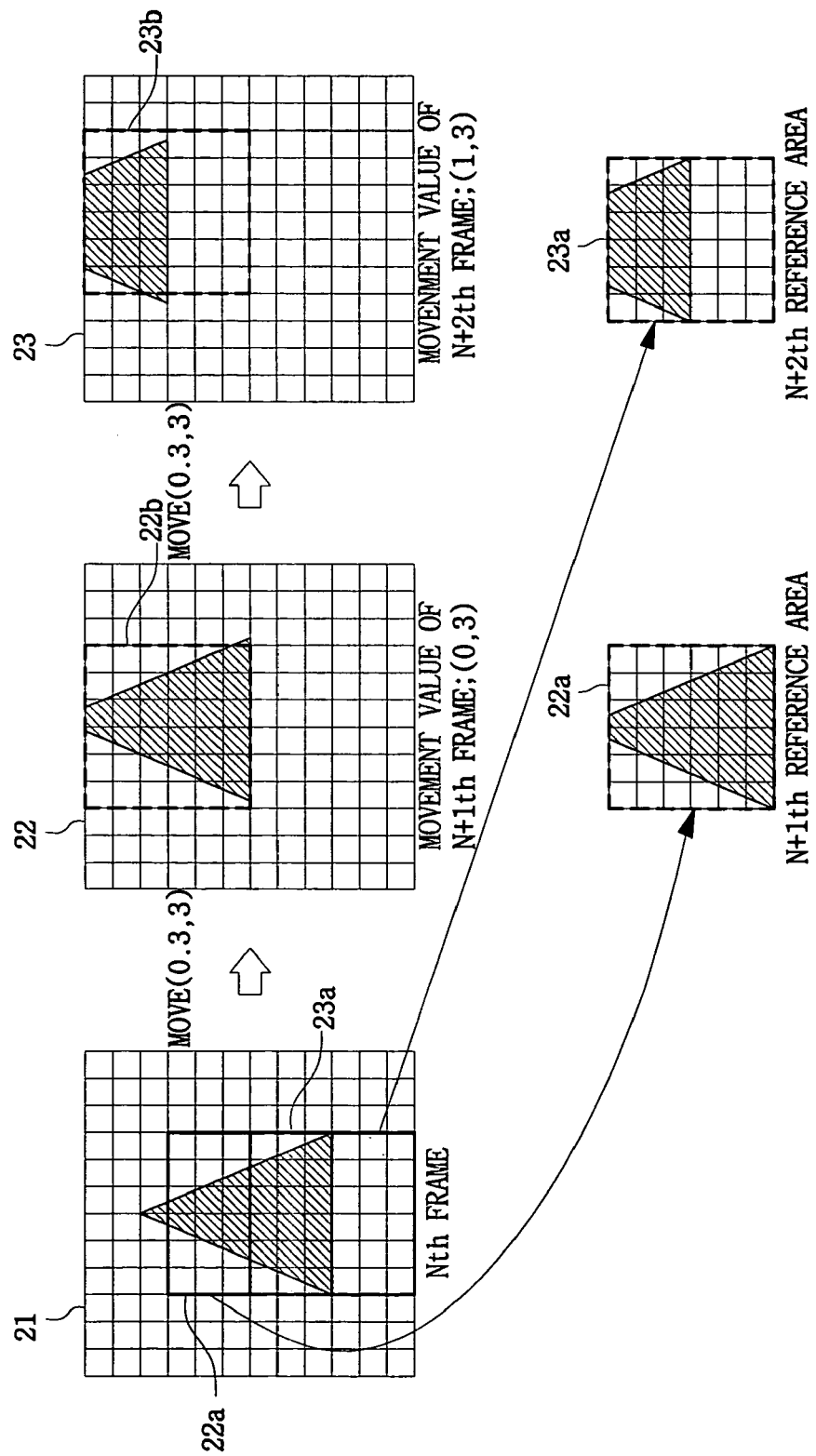
FIG. 3 is a diagram for illustrating an embodiment of a method for calculating a movement value of an optical mouse according to the present invention.

FIG. 3 is a diagram for illustrating an embodiment of a method for calculating a movement value of an optical mouse according to the present invention.

Figure 2:
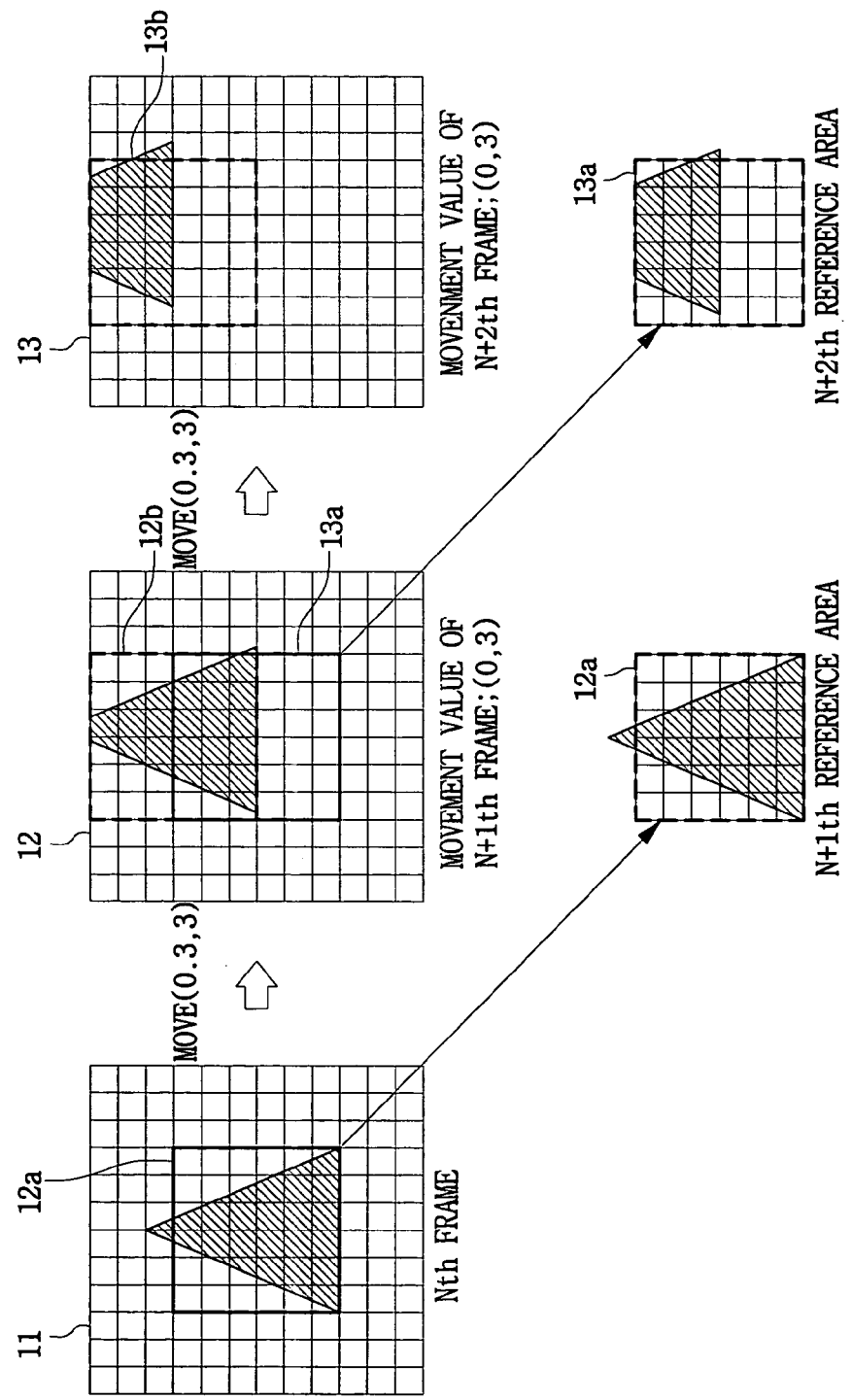
FIG. 2 is a diagram for illustrating an example of a method for calculating a movement value of an optical mouse according to a prior art.

The optical mouse of FIG. 3 is assumed that it moves 0.3 pixel in the +X direction and 3 pixel in the Y direction during every sampling period, as is the optical mouse of FIG. 2.

In order to calculate the movement value of the optical mouse during a first sampling period, the optical mouse of the present invention selects an $N_{th}$ frame 21 obtained through 12×12 image sensor during the previous sampling period as a 12×12 reference frame and stores the $N_{th}$ frame into a memory, and sets 6×6 area a center of areas of the $N_{th}$ frame 21 area as a reference area 22a, and selects the $N+1_{th}$ frame 22 obtained through the 12×12 image sensor during the first sampling period as a 12×12 sample frame and stores the sample frame into the memory.

Next, the location of the $N+1_{th}$ frame 22 having the highest correlation with the reference area 22a of the reference frame 21 is obtained.

As a result, it is shown that (0.3, 3) pixel position 22b of the $N+1_{th}$ frame 22 has the highest correlation with the reference area 22a of the reference frame 21.

Next, the optical mouse calculates the movement value as being moved zero pixel in the X direction, and 3 pixels in the Y direction during the first sampling period, and based on the correlation expression, outputs (0, 3) pixel as the movement value.

However, in fact, the optical mouse moves 0.3 pixel in the +X direction, and 3 pixel in the Y direction during the first sampling period, so that it cannot calculate the movement of 0.3 pixel in the X direction between the actual movement value and the calculated movement value.

Additionally, in order to calculate the movement value during the second sampling period, the optical mouse resets the reference area only of the $N_{th}$ frame 21 stored in the memory by considering the movement value during the first sampling period without updating the reference frame.

The location 23a of the reset reference area herein becomes the position where the reference area 22a of the existing reference frame is moved (0, −3) pixel by considering the movement value (0, 3) pixel during the first sampling period.

Next, the optical mouse selects an $N+2_{th}$ frame 23 obtained through the image sensor during the second sampling period as a sample frame, stores the $N+2_{th}$ frame into a memory, and obtains the position of the $N+2_{th}$ frame 23 having the highest correlation with the reset reference area 23a.

As a result, it is shown that (0.6, 3) pixel position 23b of the $N+2_{th}$ frame 23 has the highest correlation with the reset reference area 23a, and based on the correlation expression, the optical mouse calculates the movement value as (1, 3) pixel.

In other words, the movement value in the X direction during the second sampling period again includes the movement value in the X direction during the first sampling period, 0.3 pixel, resulting in 0.6 pixel, which is calculated as one pixel based on the correlation expression.

Therefore, during the first and the second sampling periods, the actual movement value of the optical mouse finally becomes (0.6, 6) pixel, and the calculated movement value becomes (1, 6) pixel, so that 0.6 pixel of the actual movement value is reflected to the calculated movement value.

As such, the method for setting the reference frame and the reference area and the method for calculating the movement value of the optical mouse using it according to the present invention resets the reference area only of the reference frame that is already stored in the memory, without updating the reference frame, and thus, calculates the movement in small angles such as (0.6, 6) pixel which cannot be calculated through the method of FIG. 2 from 0.6 pixel to 0.4 pixel.

Additionally, during the first and the second sampling periods, when the optical mouse moves (0.4, 1) pixel in every sample time, and thus, finally moves (0.8, 2) pixel, in case the conventional method for calculating the movement value of the optical mouse is used, the optical mouse outputs the (0, 2) pixel as the calculated movement value. However, when the method for calculating the movement value of the optical mouse of the present invention is used, the optical mouse outputs (1, 2) pixel as the calculated movement value.

Therefore, the method for calculating the movement value of the optical mouse of the present invention can calculate the movement value of small angles more than the conventional method for calculating the movement value of the optical mouse.

Figure 4:
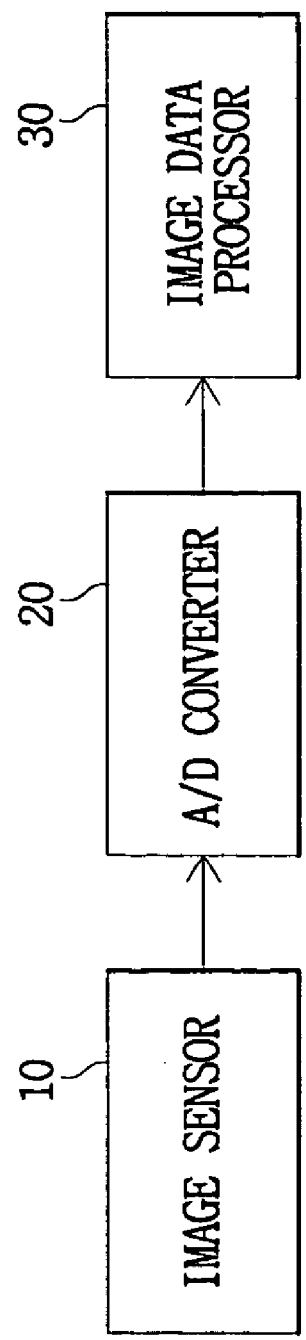
FIG. 4 is a diagram for illustrating an embodiment of an optical mouse configuration using a method for calculating the movement value of the optical mouse according to the present invention of FIG. 3.

FIG. 4 is a diagram for illustrating an embodiment of a configuration of the optical mouse that uses the method for calculating the movement value of the optical mouse according to the present invention of FIG. 3.

Referring to FIG. 4, the optical mouse of the present invention comprises an image sensor 10, an A/D converter 20, and an image data processor 30.

The image sensor 10 is made of hundreds of pixels, which obtains the image of a worktable surface from a signal accumulated during a predetermined time, outputs by pixel unit, and the A/D converter 20 receives the output of the image sensor and converts the output to a digital signal.

In the first sampling, the image data processor 30 updates the sample frame obtained during the previous sampling period as a reference frame, and sets a center area of the updated reference frame as a reference area.

Next, the image data processor 30 selects the worktable image received through the A/D converter 20 during the first sampling period as a new sample frame, and finds a correlation between the sample frame and the reference area of the reference frame to calculate the movement value.

During the first sampling period, when the sample frame is calculated as being moved m (where m is an integer) pixel in the X direction and n (where n is an integer) pixel in the Y direction from the reference area of the reference frame, an area to which the reference area of the reference frame is moved −m (where m is an integer) pixel in the X direction and −n (where n is an integer) pixel in the Y direction is reset as a new reference area.

And during the second period, the worktable image received through the A/D converter 20 is selected as the new sample frame, and a correlation between the sample frame and the reset reference area is found to calculate the movement value.

Figure 5A:
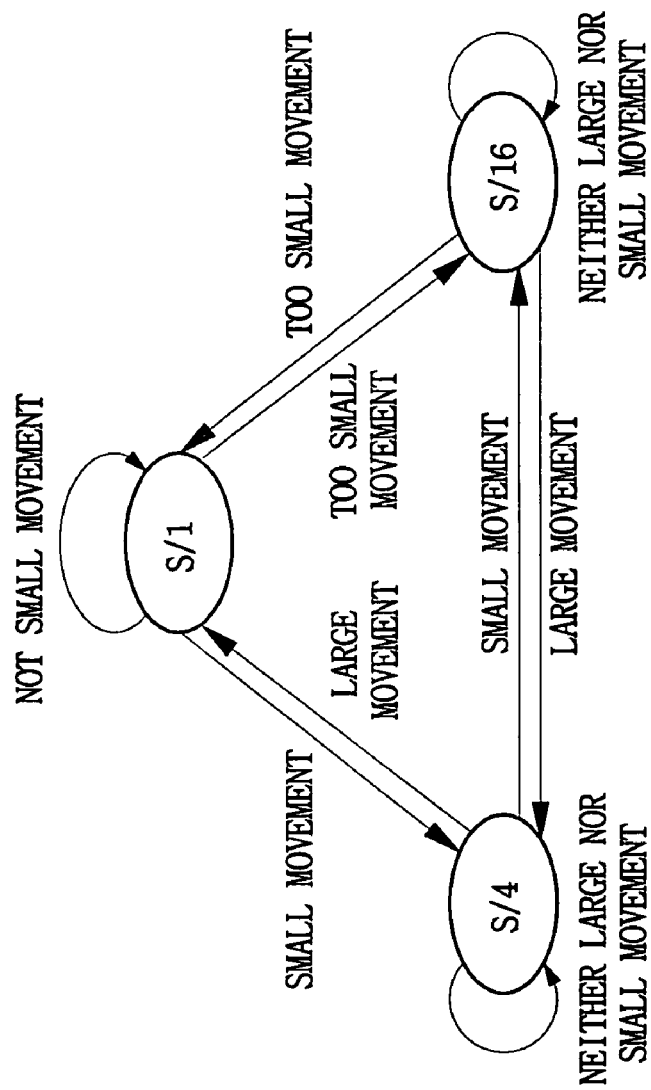
FIG. 5a is a diagram for illustrating a method for setting a reference frame update speed of the present invention.
Figure 5B:
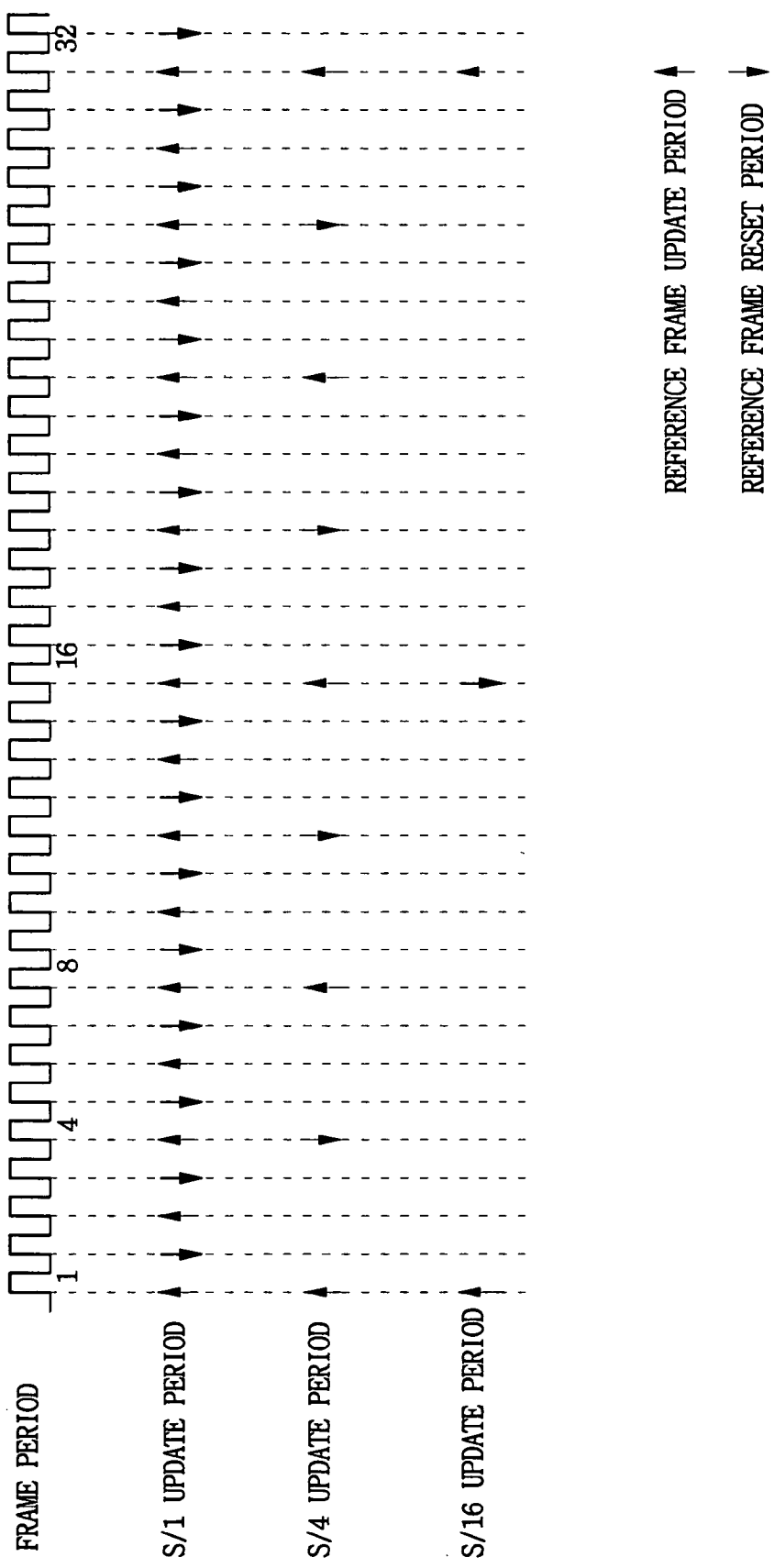
FIG. 5b is a diagram showing a method for setting a reference frame and a reference area where both the method for calculating the movement value of the optical mouse of FIG. 3 and the method for setting the reference frame update speed of FIG. 5a are applied.

FIGS. 5a and 5b are diagrams showing methods for setting the reference frame and the reference area where the method for calculating the movement value of the optical mouse of FIG. 3 is applied together with the method for setting a reference frame update speed.

Referring to FIG. 5a, the reference frame update speed of the optical mouse is defined as follows.

When the reference frame is updated in every frame, the reference frame update speed is defined as S/1 (sample/frames), when updated in every four frame, S/4, and when updated in every 16 frame, S/16.

With continuing reference to FIG. 5a, when the reference frame update speed of the optical mouse is set to S/1, the optical mouse calculates the movement value, and if the calculated movement value is not smaller than an estimated value corresponding to the speed S/1 of the optical mouse, the currently set reference frame update speed is maintained, while the calculated movement value of the optical mouse is smaller than the estimated value, the reference frame update speed is reset to S/4. Additionally, if the calculated movement value of the optical mouse is too smaller than the estimated value, the reference frame update speed is reset to S/16.

At this time, the estimated value may be an average value of the calculated movement values during a previous sampling period or a predetermined time.

In order for the optical mouse to trace the movement more correctly, the reference frame update speed is set variably based on the movement speed by applying this method also to the case where other reference frame update speeds are set.

With continuing reference to FIG. 5b, the optical mouse of the present invention updates the reference frame based on the set reference frame update speed, however, by applying the method for calculating the movement value of the optical mouse of FIG. 3, in updating a first reference frame, the optical mouse updates the reference frame, and in updating a second reference frame, the optical mouse resets only the reference area by considering the movement value of the optical mouse during the previous sampling period.

For example, in the context that the optical mouse has the S/4 reference frame update speed, it updates the reference frame in the $1_{st}$, $9_{th}$, $17_{th}$, $25_{th}$ sampling and stores again in the memory, while resets just the reference area of the reference frame that already stored in the memory in the $5_{th}$, $13_{th}$, $21_{st}$, $29_{th}$ sampling.

Such method is also applied to the case with other reference frame update speed.

As described above, when resetting a reference area of the reference frame, the present invention resets the new reference area by moving the reference area to the opposite direction by the value which is equal to the calculated movement value. However, the new reference area may be reset by moving the reference area to the opposite direction by the value which is different from the calculated movement value. That is, the new reference area may be reset by moving the reference area to the opposite direction by the value which is smaller or larger than the calculated movement value.

While the preferred embodiments of the present invention are illustrated above, it will be appreciated to the ordinary skilled in the art that a variety of modification and changes can be made without departing from the idea and scope of the present invention described in the following claims.

As described above, according to the method for calculating the movement value of the optical mouse and the optical mouse using it, when the movement value of the optical mouse is calculated, the reference area is reset based on the movement of the optical mouse, thereby calculating the movement in small angles.

What is claimed is:

1. A method for calculating a movement value of an optical mouse comprising the steps of:
   calculating a movement value, wherein the step of calculating the movement value selects a reference frame, setting a reference area from the reference frame, and finds a correlation between a current input frame and the reference area of the reference frame; and
   resetting a reference area, wherein the step of resetting the reference area sets a new reference area to which the reference area of the reference frame is moved by considering the movement value calculated in the step of calculating the movement value,
   wherein when the movement value is calculated as being moved m pixels in the X direction and n pixels in the Y direction the step of resetting the reference area sets an area to which the reference area of the reference frame is moved −p pixels in the X direction and −q pixels in the Y direction as the new reference area.

2. The method according to claim 1, wherein an absolute value of m is larger than or equal to an absolute value of p and an absolute value of n is larger than or equal to an absolute value of q, m and p have not a sign which is different from each other, and n and q have not a sign which is different from each other.

3. A method for calculating a movement value of an optical mouse comprising the steps of:
   adjusting a reference frame update speed based on a movement speed of the optical mouse and updating the reference frame;
   calculating a first movement value, wherein the step of calculating the first movement value sets a reference area in the updated reference frame, and finds a correlation between a current input frame and the reference area of the reference frame to calculate the movement value; and
   resetting a reference area, wherein the step of resetting a reference area sets a new reference frame to which the reference area of the reference frame is moved by considering the calculated movement value according to the adjusted reference frame update speed,
   wherein in the step of calculating the movement value, when the movement value is calculated as being moved m pixels in the X direction and n pixels in the Y direction, the step of resetting the reference area sets an area to which the reference area of the reference frame is moved −p pixels in the X direction and −q pixels in the Y direction as a new reference area.

4. The method of claim 3, wherein the step of updating the reference frame comprises the steps of:
   maintaining the adjusted reference frame update speed when the movement value calculated through the step of calculating the movement value is neither smaller nor larger than an estimated value corresponding to the adjusted reference frame speed,
   reducing the reference frame update speed when the calculated movement value of the optical mouse is smaller than the estimated value, and
   increasing the reference frame update speed when the calculated movement value of the optical mouse is larger than the estimated value.

5. The method of claim 4, wherein the estimated value is set to an average value of previous movement values.

6. The method according to claim 4, wherein an absolute value of m is larger than or equal to an absolute value of p and an absolute value of n is larger than or equal to an absolute value of q, m and p have not a sign which is different from each other, and n and q have not a sign which is different from each other.

7. An optical mouse comprising:
   an image sensor that obtains a surface image of a sample frame and outputs the surface image in pixel;
   an A/D converter that receives an output of the image sensor and converts the output to a digital signal; and
   an image data processor that finds a correlation between a sample frame and the reference area of a reference frame to calculate a movement value and sets a new reference area to which the reference area of the reference frame is moved by considering the calculated movement value;, wherein when the movement value is calculated as being moved m the X direction and n pixels in the Y direction, the image data processor resets an area to which the reference area of the reference frame is moved −p pixels in the X direction and −q pixels in the Y direction as the new reference area.

8. The optical mouse according to claim 7, wherein an absolute value of m is larger than or equal to an absolute value of p and an absolute value of n is larger than or equal to an absolute value of q, m and p have not a sign which is different from each other, and n and q have not a sign which is different from each other.

9. The optical mouse according to claim 7, wherein the image data processor sets the reference frame update speed based on the movement speed of the optical mouse, and in updating a first frame, updates the reference frame, and in updating a second frame, sets the new reference frame to which the reference area of the reference frame is moved by considering in previous movement values.

10. The optical mouse according to claim 7, wherein the image data processor maintains the adjusted reference frame update speed when the calculated movement value is neither smaller nor larger than an estimated value corresponding to the adjusted reference frame speed, reduces the reference frame update speed when the calculated movement value of the optical mouse is smaller than the estimated value, and increases the reference frame update speed when the calculated movement value of the optical mouse is larger than the estimated value.

11. The optical mouse of claim 10, wherein the estimated value is set to an average value of previous movement values.

* * * * *